United States Patent
Drost

(10) Patent No.: US 11,273,776 B2
(45) Date of Patent: Mar. 15, 2022

(54) DEVICE, SYSTEM, PROCESS FOR THE CONFIGURATION OF THE DEVICE, PROCESS FOR OPERATION OF THE SYSTEM, COMPUTER PROGRAM PRODUCT AND COMPUTER-READABLE MEDIUM FOR THE ELECTRICAL CONTROL OF A PLURALITY OF REAL ELECTRIC CONSUMERS OF A MOTOR VEHICLE

(71) Applicant: Hella GmbH & Co. KGaA, Lippstadt (DE)

(72) Inventor: Malte Drost, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 293 days.

(21) Appl. No.: 16/480,503

(22) PCT Filed: Jan. 29, 2018

(86) PCT No.: PCT/EP2018/052048
§ 371 (c)(1),
(2) Date: Jul. 24, 2019

(87) PCT Pub. No.: WO2018/141666
PCT Pub. Date: Aug. 9, 2018

(65) Prior Publication Data
US 2020/0017041 A1    Jan. 16, 2020

(30) Foreign Application Priority Data

Jan. 31, 2017    (DE) .................... 10 2017 101 827.1

(51) Int. Cl.
*B60L 1/00*    (2006.01)
*B60L 3/00*    (2019.01)
(Continued)

(52) U.S. Cl.
CPC ............ *B60R 16/03* (2013.01); *B60Q 1/1407* (2013.01); *G06F 3/14* (2013.01); *H05B 47/155* (2020.01)

(58) Field of Classification Search
CPC ..... B60R 16/03; B60R 16/0315; H05B 45/50; H05B 47/155; H05B 47/105; H05B 45/00; B60Q 1/1407; G06F 3/14
See application file for complete search history.

(56) References Cited

U.S. PATENT DOCUMENTS

| 5,331,214 A | * | 7/1994 | Mori | ..................... B60Q 1/1423 307/116 |
| 2003/0130776 A1 | * | 7/2003 | Busse | ................. B60R 16/0315 701/36 |

(Continued)

FOREIGN PATENT DOCUMENTS

| DE | 10 2005 025573 A1 | 12/2006 |
| FR | 2 805 362 A1 | 8/2001 |

(Continued)

*Primary Examiner* — Hal Kaplan
*Assistant Examiner* — Rasem Mourad
(74) *Attorney, Agent, or Firm* — Husch Blackwell LLP

(57) ABSTRACT

A device, a system, a configuration process, and an operating procedure are provided for the electric control of at least one real electric consumer of a motor vehicle. In order to design in a more flexible manner the electric control of at least one electric consumer of a motor vehicle, the device is implemented as a configurable device. Correlations between a plurality of actions and operating settings of a plurality of hypothetical electric consumers are stored. At least one action is selectable depending on the at least one input signal (I), and the at least one electric output of the device allocable to the at least one real electric consumer can be activated depending on the operating setting of the at least one hypothetical electric consumer allocated to the selected action.

13 Claims, 2 Drawing Sheets

(51) Int. Cl.
*B60R 16/03* (2006.01)
*H05B 47/155* (2020.01)
*B60Q 1/14* (2006.01)
*G06F 3/14* (2006.01)

(56) References Cited

U.S. PATENT DOCUMENTS

| | | | | |
|---|---|---|---|---|
| 2004/0245854 A1* | 12/2004 | Hattori | ............... | H04L 12/12 |
| | | | | 307/10.1 |
| 2008/0123637 A1* | 5/2008 | Zolls | ............... | B60R 16/0315 |
| | | | | 370/362 |
| 2013/0099575 A1* | 4/2013 | Loubier | ............... | G05B 19/02 |
| | | | | 307/77 |

FOREIGN PATENT DOCUMENTS

| | | |
|---|---|---|
| WO | 00/07849 A1 | 2/2000 |
| WO | 01/52049 A1 | 7/2001 |
| WO | 2008/149235 A2 | 12/2008 |

* cited by examiner

DEVICE, SYSTEM, PROCESS FOR THE CONFIGURATION OF THE DEVICE, PROCESS FOR OPERATION OF THE SYSTEM, COMPUTER PROGRAM PRODUCT AND COMPUTER-READABLE MEDIUM FOR THE ELECTRICAL CONTROL OF A PLURALITY OF REAL ELECTRIC CONSUMERS OF A MOTOR VEHICLE

CROSS REFERENCE

This application claims priority to PCT Application No. PCT/EP2018/052048, filed Jan. 29, 2018, which itself claims priority to German Patent Application 10 2017 101827.1, filed Jan. 31, 2017, the entirety of both of which are hereby incorporated by reference.

FIELD OF THE INVENTION

The present invention relates to a device for the electric control of a plurality of real electric consumers of a motor vehicle, a system comprising a plurality of real electric consumers of a motor vehicle and a device for the electric control of the plurality of real electric consumers of the motor vehicle, a process for the configuration of a configurable device, and a process for operating a system for the control of a plurality of real electric consumers of a motor vehicle and a computer program product and a computer-readable medium.

BACKGROUND

In general, the known devices for the electric control of a plurality of electric consumers of a motor vehicle have a processing unit, where the processing unit is designed to receive and process at least one electric input signal and, depending on how the input signal is processed, to generate at least one electric output signal and to output the same to at least one of the electric consumers by means of at least one electric output of the device.

The known systems comprise a plurality of electric consumers of a motor vehicle and a device for the electric control of the plurality of electric consumers of the motor vehicle according to the above description.

The known processes for the operation of such a system for the control of a plurality of electric consumers are usually made in such a way that a device outputs to an electric consumer by means of an electric output of the device an electric output signal depending on an electric input signal, where the electric input signal is processed in a processing unit of the device.

Furthermore, processes for the configuration of configurable devices are generally known.

The known computer program products comprise commands that cause the known devices and systems to execute the processes steps of the known processes.

The aforementioned known computer program products are stored on the known computer-readable media.

SUMMARY OF THE INVENTION

This is where the present invention comes in.

The present invention is based on the task of designing in a more flexible manner the electric control of at least one electric consumer of a motor vehicle.

One material advantage of the invention arises from the fact that the electric control of at least one real electric consumer of a motor vehicle is designed in a more flexible manner by correlations between a plurality of actions and operating settings of a plurality of hypothetical electric consumers being stored in the memory, where at least one action from the plurality of actions is selectable depending on the at least one input signal and the electric output of the device allocable to the at least one real electric consumer and can be activated depending on the operating setting of the at least one hypothetical electric consumer allocated to the selected action. The configurability of the device in accordance with the invention makes it possible to replace the direct correlation existing to date between the at least on electric input signal and the at least one electric output signal with a flexible correlation. This makes the configurable device in accordance with the invention usable for a large number of application cases, for example for a large number of differing types and models of motor vehicle, even from different motor vehicle manufacturers. The same applies for the system in accordance with the invention, which comprises a configurable device in accordance with the invention.

The process in accordance with the invention for configuration of a configurable device in accordance with the invention and the process in accordance with the invention for operation of a system in accordance with the invention are correspondingly designed in a manner, according to which the process in accordance with the invention for configuring the configurable device involves setting up the configurable device for the selection of at least one action from a plurality of actions stored in a memory of the configurable device depending on the at least one input signal, an operating setting of at least one hypothetical electric consumer from operating settings of a plurality of hypothetical electric consumers stored in the memory depending on the selected at least one action and for activation of at least one electric output of the device allocable to at least one real electric consumer depending on the selected operating setting, and according to which the process in accordance with the invention for operating the system in accordance with the invention involves selecting at least one action from a plurality of actions stored in the memory of the configurable device depending on the at least one input signal and an operating setting of at least one hypothetical electric consumer from operating settings of a plurality of hypothetical electric consumers stored in the memory depending on the at least one action selected, activating at least one electric output of the device allocated to at least one real electric consumer depending on the selected operating setting and sending an electric output signal to the at least one real electric consumer allocated to the electric output by means of the activated electric output of the configurable device.

As a result, real electric consumers of any kind and number, within suitable and meaningful limits, can be allocated to the electric output of the configurable device depending on the application case.

One particularly advantageous refinement of the device in accordance with the invention specifies that the correlations between the plurality of actions and the operating settings of the plurality of hypothetical electric consumers is designed changeably or changeably to a previously defined step in the configuration of the device and unchangeably after this step. It is in principle conceivable that the correlations between the plurality of actions and the operating settings of the plurality of hypothetical electric consumers are designed unchangeably, i.e. the correlations are no longer changeable following manufacture of the device in accordance with the invention. In contrast, changeable correlations between the plurality of actions and the operating settings of the plurality of hypothetical electric consumers have the advantage, however, that the device in accordance with the invention can be used even more flexibly in accordance with this refinement. For example, this device in accordance with the invention could be produced by an automotive supplier such that it can then be individually configured at the automotive manufacturer, that is to say the manufacturer of motor vehicles, during the manufacture of the respective motor vehicle. A limitation placed on the changeability of the correlations between the plurality of actions and the operating settings of the plurality of hypothetical electrical consumers up to a previously defined step in the configuration of the device ensures that any unwanted change in the correlations is subsequently no longer possible. For example, completion of the motor vehicle at the motor vehicle manufacturer would be a suitable point in time for this. Any unwanted manipulation in the correlations subsequent to delivery of the motor vehicle to sales partners, dealers or even to the end customer would then be effectively prevented.

The same applies mutatis mutandis to the process in accordance with the invention for the configuration of a configurable device in accordance with the invention, according to which the correlations between the operating settings of the plurality of hypothetical electric consumers and the plurality of actions are changeable or changeable until a previously determined step in the configuration of the device and unchangeable after this step.

In principle, the plurality of real electric consumers can be selected at will, within wide appropriate limits, according to type, dimensions as well as spatial arrangement, and the layout of circuits. The device in accordance with the invention can be deployed especially advantageously with a design of the plurality of real electric consumers as plurality of real lighting units and the plurality of hypothetical electric consumers as hypothetical lighting units, where in each case at least one of the real lighting units is allocated to at least one of the hypothetical lighting units. In modern motor vehicles, a large number of electric lighting units are used, where in this respect it is not uncommon for the electric lighting units to be based on differing physical principles and correspondingly have to be controlled in different ways. The different light sources for lighting units such as bulbs, halogen spotlights, LEDs and the like are only a few examples that can be named in this context. The term "lighting unit" in this respect should be interpreted broadly and does not merely comprise one or several light sources, but also the lenses and the like interacting with the light sources. Alongside the real and hypothetical electric consumers designed as lighting units, the plurality of the real and the plurality of the hypothetical electric consumers can also comprise other real and hypothetical electric consumers not designed as lighting units.

The same applies to the advantageous refinement of the system in accordance with the invention, according to which the plurality of real electric consumers comprises real lighting units and the plurality of hypothetical electric consumers comprises hypothetical lighting units, where in each case at least one of the real lighting units is allocated to one of the hypothetical lighting units.

One advantageous refinement of the last-mentioned embodiment of the device in accordance with the invention specifies that the at least one operating setting of at least one of the hypothetical lighting units comprises at least one brightness ratio of a target brightness to a maximum achievable brightness of the hypothetical lighting unit, as the brightness ratio explained is a universally valid parameter for the plurality of hypothetical lighting units and does not depend on the concrete design of the real, that is to say the actual, lighting units.

In an advantageous refinement of the last-mentioned embodiment, it is specified that the at least one operating setting comprises a plurality of brightness ratios of a previously determined chronological sequence of the individual brightness ratios. In this way, it is also possible to implement dynamic lighting functions, such as what is known as a "sweeping indicator" or the like.

An advantageous refinement based on the aforementioned embodiment specifies that the plurality of brightness ratios are at least in part allocated to different time spans of the application of the respective brightness ratio. This makes it possible to design dynamic lighting functions in an even more effective manner.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
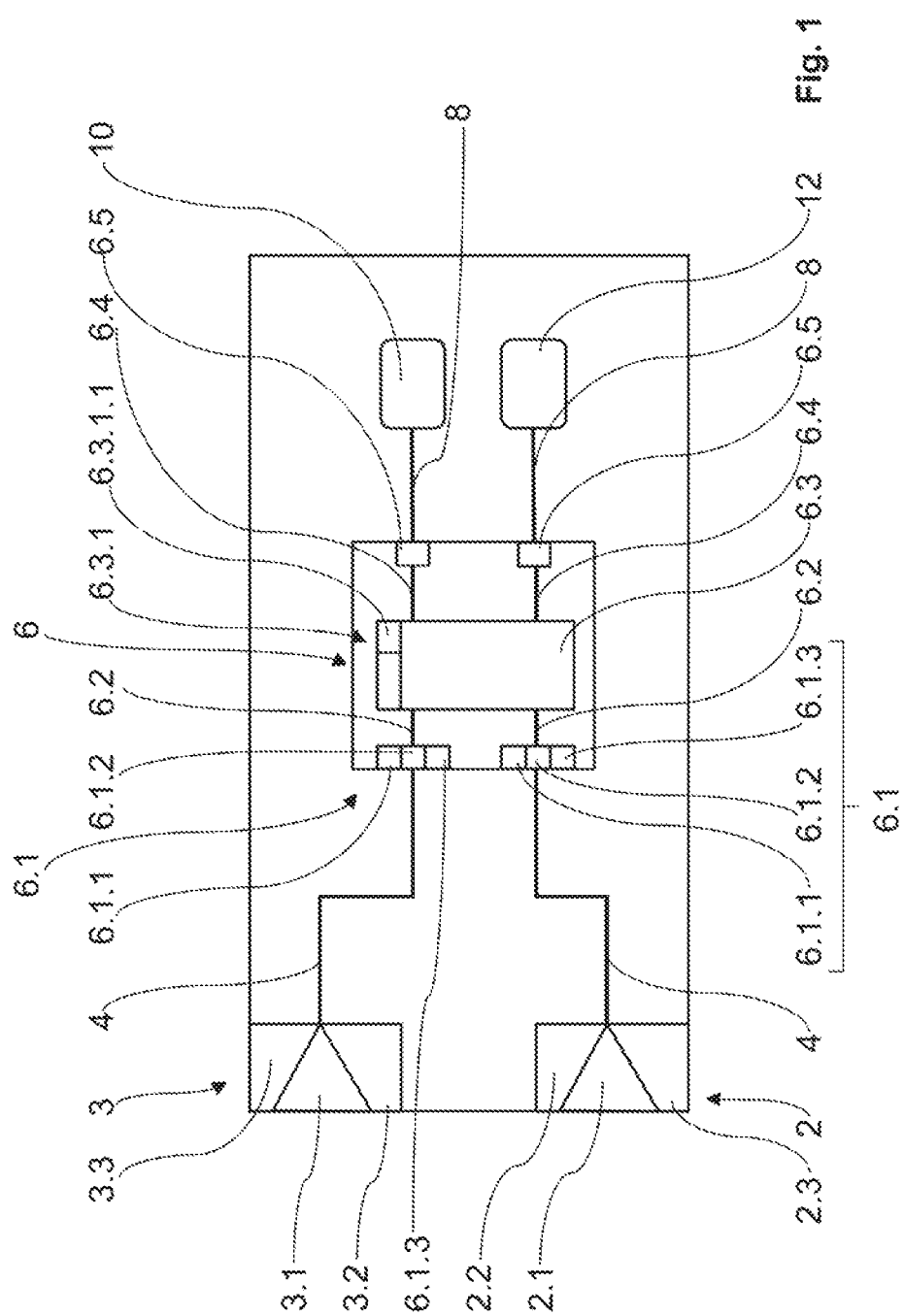
FIG. 1 is an example embodiment of a system in accordance with the invention, comprising a device in accordance with the invention in a schematic representation.

FIG. 1 shows a sample embodiment of a system in accordance with the invention in a schematic representation. The system comprises a plurality of real electric consumers, namely a left headlight 2 with a left low beam light 2.1 designed as an LED light module, a left cooling fan 2.2 for cooling the left LED light module 2.1 and a left flasher unit 2.3 and a right headlight 3 with a right low beam light 3.1 designed as an LED light module, a right cooling fan 3.2 for cooling the right LED light module 3.1 and a right flasher unit 3.3. The left and the right flasher unit 2.3 and 3.3 have in each case a bulb as light source, which is not shown. Similarly, the LEDs of the light modules 2.1 and 3.1 are not represented.

The aforementioned components of the two headlights 2 and 3, namely the LED light modules 2.1, 3.1, the cooling fan 2.2, 3.2 and the flasher units 2.3, 3.3, are in contact with a configurable device 6 for signal transmission by means of electric output signal cables 4 in a manner known to a specialist. The configurable device 6 is implemented as a control unit 6 and has two electric output blocks 6.1 allocated to the two electric output signal cables 4; these blocks, in turn, are in contact with a processing unit 6.3 of the configurable device 6 for signal transmission by means of a first internal electric signal cable 6.2. Each of the two electric output blocks 6.1 of the configurable device 6 has an electric output 6.1.1 for the respective low beam light 2.1, 3.1, an electric output 6.1.2 for the respective cooling fan 2.2, 3.2 and an electric output 6.1.3 for the respective flasher unit 2.3, 3.3.

The processing unit 6.3 has an internal memory 6.3.1 with a configurable area 6.3.1.1. In addition, the processing unit 6.3 is in contact with two electric inputs 6.5 for signal transmission by means in each case of a second internal electric signal cable 6.4, where the electric inputs 6.5 are in contact for signal transmission with an ambient light sensor 10 and a switching stalk 12 to trigger a left or a right flashing signal by means of electric input signal cables 8. Depending on what the ambient light sensor 10 detects and the switching state of the switching stalk 12, electric input signals are present at the electric inputs 6.5.

The configurable area 6.3.1.1 of the memory 6.3.1 is designed for data that define at least a first correlation between the aforementioned input signals and at least one event, at least a second correlation between the at least one event and plurality of actions, third correlations between the plurality of actions and the operating settings of a plurality of hypothetical electric consumers and at least one fourth correlation between the plurality of hypothetical electric consumers and at least one electric output signal at the real electric consumers allocated to the respective electric output 6.1.1, 6.1.2, 6.1.3, namely the low beam lights 2.1, 3.1, the cooling fans 2.2, 3.2 and the flasher units 2.3, 3.3.

Figure 2:
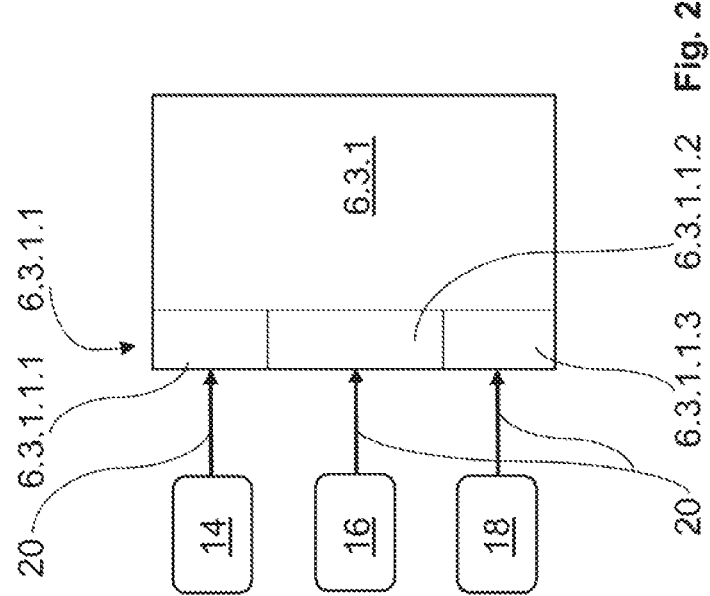
FIG. 2 illustrates the memory of the device in accordance with the invention from FIG. 1 in a schematic representation.

The memory 6.3.1 of the processing unit 6.3 can be connected for data transmission with three external data mediums 14, 16 and 18 represented in FIG. 2, where data from the external data mediums 14, 16 and 18 can be transferred into the configurable area 6.3.1.1 of the memory 6.3.1. For the purpose of data transfer from the respective data carrier 14, 16 and 18 into the configurable area 6.3.1.1 of the memory 6.3.1, it is possible to create in each case a data transfer connection between the respective data medium 14, 16 and 18 by means of a data transfer cable 20 with a configurable subarea 6.3.1.1.1, 6.3.1.1.2 and 6.3.1.1.3 of the configurable area 6.3.1.1 of the memory 6.3.1 in a manner known to a specialist.

As can be seen from FIG. 2, the data medium 14 is allocated to the configurable subarea 6.3.1.1.1, the data carrier 16 to the configurable subarea 6.3.1.1.2 and the data carrier 18 to the configurable subarea 6.3.1.1.3, where once a data transfer connection has been created in each case data defining a first correlation between the at least one input signal and the at least one event can be transferred from the data carrier 14 into the configurable subarea 6.3.1.1.1 of the memory 6.3.1 via the allocated data transfer cable 20, data defining at least one second correlation between the at least one second correlation between the at least one event and the plurality of actions and data defining third correlations between the plurality of actions and the operating settings allocated to the plurality of hypothetical electric consumers can be transferred from the data carrier 16 into the configurable subarea 6.3.1.1.2 of the memory 6.3.1 via the allocated data transfer cable 20 and data defining at least one fourth correlation between the operating settings allocated to the plurality of hypothetical electric consumers and the at least one electric output signal to the real electric consumers allocated to the electric outputs 6.1.1, 6.1.2 and 6.1.3, namely the low beam lights 2.1, 3.1, the cooling fans 2.2, 3.2 and the flasher units 2.3, 3.3 can be transferred from the data carrier 18 into the configurable subarea 6.3.1.1.3 of the memory 6.3.1 via the allocated data transfer cable 20.

The process for configuring the configurable device 6 is explained in the following on the basis of FIG. 1.

The configurable device 6 of the system in accordance with the invention according to the present sample embodiment is set up according to the process in accordance with the invention for configuring the configurable device 6 in order to receive and process the electric input signals from the ambient light sensor 10 and the switching stalk 12 by means of the electric input signal cables 8, the electric inputs 6.5 and the second internal electric signal cables 6.4 in the processing unit 6.3 in order to select at least one event stored in the memory 6.3.1 depending on the at least one first correlation between the at least one input signal and the at least one event stored in the memory 6.3.1 in order to select at least one action stored in the memory 6.3.1 depending on the at least one second correction between the at least one event and the at least one action stored in the memory 6.3.1 in order to select an operating setting of at least one hypothetical electric consumer from operating settings of a plurality of hypothetical electric consumers stored in the memory depending on the third correlations between the operating settings of the plurality of hypothetical electric consumers and the plurality of actions stored in the memory 6.3.1 and in order to activate at least one of the electric outputs 6.1.1, 6.1.2, 6.1.3 depending on the selected operating setting.

The aforementioned third correlations between the operating settings of the plurality of hypothetical electric consumers and the plurality of actions are, in the present sample embodiment, changeable until a previously determined step in the configuration of the configurable device 6 and unchangeable after this step.

Figure 3:
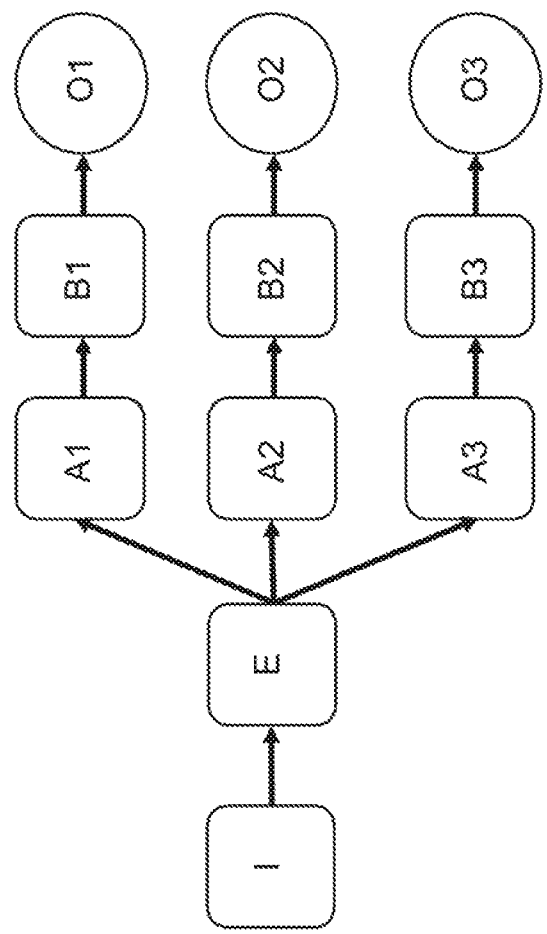
FIG. 3 is a flow chart of an example embodiment of a process in accordance with the invention for operating the system from FIG. 1.

In addition, the process in accordance with the invention for operating the system in accordance with the invention according to the present sample embodiment is explained using FIGS. 1 and 3.

The processing unit 6.3 of the configurable device 6 of the system in accordance with the invention according to the sample embodiment receives by means of the electric input signal cables 8, the two electric inputs 6.5 and the second internal electric signal cables 6.4 the electric input signals transmitted by the ambient light sensor 10 and the switching stalk 12. In the present sample embodiment, these are the input signals I corresponding to a low ambient brightness detected by the ambient light sensor 10 and the selection of the left flasher unit 2.3 detected by the switching stalk 12.

During processing of these input signals I in the processing unit 6.3, at least one allocated event is selected depending on the presence of the input signals I and by means of the at least one first correlation stored in the memory 6.3.1. In the present sample embodiment, an event E has been specified and stored for the presence of the aforementioned combination of the input signals I, namely that the left flasher unit 2.3 should be switched on, that the two low beam lights 2.1 and 3.1 should be switched on and that the two cooling fans 2.2 and 3.2 should be switched on.

Depending on the at least one second correlation between the at least one event E and the at least one action stored in the memory 6.3.1, at least one of the at least one action stored in the memory 6.3.1 is selected by means of the processing unit 6.3. In the present sample embodiment, if the event E described above is present, three actions A1, A2 and A3 have been defined and stored, namely that the two low beam lights 2.1 and 3.1 are switched on (A1), that the two cooling fans 2.2 and 3.2 are switched on (A2), and that the left flasher unit 2.3 is switched on (A3).

Depending on the three actions selected A1, A2 and A3, the electric outputs 6.1.1 for the left and the right low beam light 2.1 and 3.1, the electric outputs 6.1.2 for the left and the right cooling fan 2.2 and 3.2 and the electric output 6.1.3 for the left flasher unit 2.3 are activated in such a way that in each case an electric output signal O1, O2, O3 are output at the real electric consumers 2.1, 3.1, 2.2, 3.2, 2.3 connected to the respective electric output 6.1.1, 6.1.2 and 6.1.3 by means of the electric output cables 4, where O1 stands for the electric output signal to the left and the right low beam light 2.1, 3.1, O2 for the electric output signal to the left and the right cooling fan 2.2, 3.2 and O3 for the electric output signal to the left flasher unit 2.3. The electric output 6.1.3 for the right flasher unit 3.3 remains deactivated so that no electric output signal is output at the right flasher unit 3.3.

In this respect, the two low beam lights 2.1, 3.1, the two cooling fans 2.2, 3.2 and the left flasher unit 2.3 are not electrically controlled immediately after selection of the actions A1, A2 and A3. In accordance with the invention, a level of abstraction is inserted between the one selected action and the electric control of the real electric consumers, namely the plurality of hypothetical electric consumers with their operating settings, where the operating settings of the plurality of stored hypothetical electric consumers are allocated to stored actions by means of the third correlations. In the present sample embodiment, an operating setting B1 for the left and the right low beam light 2.1, 3.1 is allocated to the action A1 in each case, one operating setting B2 for the left and the right cooling fan 2.2, 3.2 is allocated to the action A2 in each case and an operating setting B3 for the left flasher unit 2.3 is allocated to the action A3.

The use of a plurality of hypothetical electric consumers with their operating settings makes it possible to allocate single or several real electric consumers to these hypothetical electric consumers. For example, this makes it possible to combine the left and the right low beam light 2.1, 3.1 to one hypothetical electrical consumer formed as a hypothetical lighting unit with the operating setting B1. It would, however, also be conceivable for the left and the right low beam 2.1, 3.1 each individually to be allocated to a hypothetical lighting unit.

In this context, it should be noted that in the selection of the event E depending on the input signals I, the selection of the three actions A1, A2 and A3 depending on the event E, the selection of the operating settings B1, B2 and B3 depending on the actions A1, A2 and A3 and the activation of the electric outputs 6.1.1, 6.1.2 and 6.1.3 depending on the operating settings B1, B2 and B3, the real electric consumers, namely the concrete design of the low beam lights 2.1, 3.1, the cooling fan 2.2, 3.2 and the flasher unit 2.3, 3.3, are not the decisive factor. For example, it is immaterial for the aforementioned process steps which specific light sources are concerned with regard to the two flasher units 2.3, 3.3 or the two low beam lights 2.1, 3.1. These and other concrete designs of the real, that is to say actual, electric consumers do not become relevant until the last-mentioned process step in which the electric output signals O1, O2, O3 are actually output to the two low beam lights 2.1, 3.1, to the two cooling fans 2.2, 3.2 and the left flasher unit 2.3 by means of the electric outputs 6.1.1, 6.1.2 and 6.1.3. For example, the bulb of the left flasher unit 2.3 has to be electrically controlled in a different way than the LED light modules of the two low beam lights 2.1, 3.1.

If the light sources of the two flasher units 2.3, 3.3 were not implemented as bulbs but as LEDs, the electric control would be completely different. With the exception of the last-mentioned process step, the concrete embodiment of the lighting unit, for example the design of its light source, would however not be relevant. It is not until the last process step, namely during the output of an electric output signal to the at least one real electric consumer of the configurable device allocated to the at least one activated electric output, that there is any relevance to the real electric consumer. Correspondingly, the invention can be advantageously deployed in differing motor vehicle models of a motor vehicle manufacturer and even across all vehicle manufacturers.

The operating settings of the plurality of hypothetical electric consumers of an abstract nature. In this way, the operating settings B1 of the left and right low beam lights 2.1, 3.1 implemented as hypothetical lighting units comprise a brightness ratio of a target brightness to a maximum achievable brightness of the respective hypothetical lighting unit, where the brightness ratios amount to 1 in each case in the present sample embodiment. In the present action A1, the hypothetical lighting units to which the left and the right low beam light 2.1, 3.1 are allocated should be switched on at 100% of the maximum possible brightness. The same applies for the present action A3 and the hypothetical lighting unit to which the left flasher unit 2.3 is allocated. With other actions, it would, however, also be conceivable that the at least one operating setting of at least one hypothetical electric consumer implemented as a hypothetical lighting unit comprises a plurality of brightness ratios of a previously determined chronological sequence of the individual brightness ratios, or, that a differing time span of the application of the respective brightness ratio is allocated at least in part to the plurality of brightness ratios of the at least one operating setting.

The same applies mutatis mutandis for the hypothetical electric consumers and their operating settings to which the left and the right cooling fan 2.2, 3.2 are allocated. Instead of a brightness ratio as with the hypothetical lighting units explained above, their operating settings B2 comprise a rotational speed ratio of a target rotational speed to a maximum achievable rotational speed of the respective hypothetical consumer. In the present case, the rotational speed ratio amounts to 0.5. With the present action A2, the hypothetical electric consumers to which the left and the right cooling fan 2.2, 3.2 are allocated are to be operated at 50% of the maximum possible rotational speed.

Deviating from the above sample embodiment, it could be specified in an alternative embodiment for example that the driver of the motor vehicle moves the switching stalk in such a way that the right flasher unit is selected. Otherwise, the starting point in the alternative sample embodiment would be identical to the embodiment explained above. This alternative is not represented in FIGS. 1 through 3, but is explained only using text. Due to the modification, i.e. selecting the right flasher unit instead of the left flasher unit by means of the switching stalk, there would be another combination of electric input signals I' that by means of a further first correlation would lead to the selection of a further event E', according to which, in addition to the two low beam lights and the two cooling fans, the right flasher unit is to be selected instead of the left flasher unit. A further correlation between the event E and the actions A1, A2 and A3' stored in the memory of the processing unit would lead to the actions A1, A2 and A3' being selected, according to which the two low beam lights are switched on by means of the action A1, the two cooling fans by means of the action A2 and the right flasher unit by means of the action A3'. On the basis of further third correlations, the operating settings B1, B2 and B3' would be selected and finally further fourth correlations between the selected operating settings B1, B2 and B3' and the electric output signals O1, O2 and O3' would lead to the output of electric output signals O1, O2 and O3', namely to the two low beam lights (O1), to the two cooling fans (O2) and to the right flasher unit (O3').

The invention is not limited to the present sample embodiment and the aforementioned alternative. The at least one, in each case, input signal, event, output signal and the plurality of actions and operating settings of hypothetical electric consumers can be selected at will, within wide appropriate limits, according to type and correlation between the at least one input signal and the at least one event, between the at least one event and the plurality of actions, between the plurality of actions and the plurality of operating settings as well as between the plurality of operating settings and the at least one output signal.

Similarly, the aforementioned correlations relating to the input signal I and the event E can be 1:1 correlations, 1:N correlations, N:1 correlations or N:N correlation, where N is any natural number with the exception of zero. For example, an input signal might lead to an event (1:1 correlation) or to a plurality of events (1:N correlation). However, a plurality of input signals could also lead to a single event (N:1 correlation) or to a plurality of events (N:N correlation). The plurality of actions and the plurality of correlations relating to operating settings are, by their very nature, N:N correlations.

The at least one electric input signal can be implemented not only as a switching state of switches or the like. A previously determined time course of an electric input signal, for example a change in a switching status, can also be utilized in accordance with the invention.

Instead of exactly one real electric consumer being allocated to every electric output, it is also possible for a plurality of real electric consumers to be allocable or allocated to at least one of the electric outputs.

Differing from the present sample embodiment, an indirect control, for example via an ASIC (application specific integrated circuit) or the like is also conceivable instead of a direct electric control of the at least one real electric consumer.

Data that define differing correlations do not necessarily have to be transferred from different external data mediums into the at least one configurable area of the memory of the processing unit. In principle, this can also be facilitated by means of a single external data medium and a single interface for the exchange of data between the processing unit and the external data medium. The memory does not necessarily have to be implemented as an integral component of the processing unit. This means that the processing unit and the memory do not form a physical unit.

Furthermore, the signal and data transfer can be selected by a specialist at will within wide appropriate limits taking account of the specific demands and applications. For example, wireless signal and/or data transfer would be conceivable in principle.

Furthermore, the bus systems can be advantageously used in the manner known to a specialist.

In the sample embodiment, a conscious decision was made to select simple relationships as examples in the interest of simplicity. The invention is, however, of advantage specifically with a large number of potential real and hypothetical electric consumers and actions. Correspondingly, the invention can be used advantageously in modern motor vehicles with a high level of electrification. This is especially useful nowadays on account of the large number of motor vehicle models from each motor vehicle manufacturer and the frequent model changes. The invention is also advantageous for automotive suppliers as the high level of flexibility of the solution in accordance with the invention allows it to be used across all vehicle manufacturers. The configurability makes it possible for the device in accordance with the invention and the system equipped with the same to be adapted to differing motor vehicle models and motor vehicle manufacturer requirements.

Adaptation of the configurable device, i.e. for example the control unit integrated into the system of the sample embodiment and a system equipped with the same, is easily possible without the core of the configurable device, namely the correlation between a plurality of actions and operating settings of a plurality of hypothetical electric consumers, needing to be changed. This means that modification of the software of the control unit is not absolutely necessary. Similarly, parametrization of the control unit is less complicated. This means that the configurable device and a system equipped with the same can be modified on the input side and/or output side to the respective motor vehicle and new hardware components, such as for example new hardware drivers or the like while at the same time maintaining the correlation of a plurality of actions and operating settings of a plurality of hypothetical electric consumers. This is, however, also possible as explained using the sample embodiment as an example. The invention thus reduces any modification effort and thus the modification costs and additionally reduces the risk involved in modification. The invention can be deployed especially advantageously with light functions of motor vehicles as there is in this respect a wide range of differing lighting concepts, light sources and the like. This not only applies in a comparison of motor vehicles from different motor vehicle manufacturers but also in a comparison of differing motor vehicle models of one motor vehicle manufacturer. Due to the level of abstraction of the hypothetical electric consumers, the invention ensures that adaptation is simple even in the case of subsequent changes, for example equipping a motor vehicle model with other real lighting units as part of updating models and the associated conversion to other real light sources. Complicated reparameterization or even an extensive reprogramming of the configurable device are unnecessary.

In embodiments of the invention alternative to the present sample embodiment, it is possible to provide for other interrelationships between the at least one electric input signal and the at least one action selectable or selected depending on the electric input signal. The only decisive factor is for there to be an interrelationship, i.e. a correlation, between the at least one electric input signal and the at least one action.

LIST OF REFERENCE NUMBERS

2 Left headlight
2.1 Left low beam of the headlight 2 implemented as LED light module
2.2 Left cooling fan of the headlight 2
2.3 Left flasher unit of the headlight 2
3 Right headlight
3.1 Right low beam of the headlight 3 implemented as LED light module
3.2 Right cooling fan of the headlight 3
3.3 Right flasher unit of the headlight 3
4 Electrical output signal cables
6 Configurable device, implemented as control unit
6.1 Electric output blocks of the configurable device 6
6.1.1 Electric outputs, allocated to the low beam lights
6.1.2 Electric outputs, allocated to the cooling fans
6.1.3 Electric outputs, allocated to the flasher units
6.2 First internal electric signal cables of the configurable device 6
6.3 Processing unit of the configurable device 6
6.3.1 Internal memory of the processing unit 6.3

6.3.1.1 Configurable area of the internal memory 6.3.1
6.3.1.1.1 Subarea of the configurable area 6.3.1.1
6.3.1.1.2 Subarea of the configurable area 6.3.1.1
6.3.1.1.3 Subarea of the configurable area 6.3.1.1
6.4 Second internal electric signal cables of the configurable device 6
6.5 Electric inputs of the configurable device 6
8 Electric input signal cables
10 Ambient light sensor
12 Switching stalk
14 External data medium
16 External data medium
18 External data medium
20 Data transfer cables
I Electric input signal
E Event
A1, A2, A3 Action
B1, B2, B3 Operating setting of the hypothetical electric consumer
O1, O2, O3 Electric output signal

The invention claimed is:

1. A device for the electrical control of a plurality of real electric consumers of a motor vehicle, the device comprising:
a memory that stores correlations between a plurality of actions and a plurality of operating settings that correspond to a plurality of virtual electric consumers, wherein each of the plurality of operating settings includes a respective universally valid parameter that is independent of the plurality of real electric consumers;
a processing unit designed to receive and process at least one electric input signal and to generate and output at least one electric output signal to at least one of the real electric consumers via at least one electric output,
where the processing unit:
selects at least one of the plurality of actions based on the at least one input signal,
identifies at least one of the plurality of operating settings that is correlated in the memory with the at least one of the plurality of actions,
allocates the at least one electric output to the at least one of the plurality of real electric consumers that is activated depending on the at least one of the plurality of operating settings of the at least one virtual electric consumer allocated to the selected action, and
generates the at least one output signal output to the at least one of the plurality of real electric consumers based on the at least one of the plurality of operating settings that is correlated in the memory with the at least one of the plurality of actions and the at least one of the plurality of real electric consumers allocated to the at least one electric output.

2. The device in accordance with claim 1, wherein the correlations between the plurality of actions and the plurality of operating settings of the plurality of virtual electric consumers is changeable up to a previously defined step in the configuration of the device and is unchangeable after said previously defined step.

3. The device in accordance with claim 1 wherein the plurality of real electric consumers comprises real lighting units and the plurality of virtual electric consumers comprises virtual lighting units, where in each case one of the real lighting units is allocated to one of the virtual lighting units.

4. The device in accordance with claim 3, wherein the at least one operating setting of at least one of the virtual lighting units comprises at least one brightness ratio of a target brightness to a maximum achievable brightness of the virtual lighting unit.

5. The device in accordance with claim 4, wherein the at least one operating setting comprises a plurality of brightness ratios in a previously determined chronological sequence.

6. The device in accordance with claim 5, wherein the plurality of brightness ratios are allocated at least in part to a different time span of the application of the respective brightness ratio.

7. A system comprising:
a plurality of real electric consumers of a motor vehicle; and
a device for the electrical control of the plurality of real electric consumers, the device comprising:
a memory that stores correlations between a plurality of actions and a plurality of operating settings that correspond to a plurality of virtual electric consumers, wherein each of the plurality of operating settings includes a respective universally valid parameter that is independent of the plurality of real electric consumers; and
a processing unit for receiving and processing at least one electric input signal and to generate and output at least one output signal to at least one of the real electric consumers via at least one electric output,
where the processing unit:
selects at least one of the plurality of actions based on the at least one input signal,
identifies at least one of the plurality of operating settings that is correlated in the memory with the at least one of the plurality of actions,
allocates the at least one electric output to the at least one of the plurality of real electric consumers that is activated depending on the at least one of the plurality of operating settings of the at least one virtual electric consumer allocated to the selected action, and
generates the at least one electric output signal output to the at least one of the plurality of real electric consumers based on the at least one of the plurality of operating settings that is correlated in the memory with the at least one of the plurality of actions and the at least one of the plurality of real electric consumers allocated to the at least one electric output.

8. The system in accordance with claim 7, wherein the plurality of real electric consumers comprises real lighting units and the plurality of virtual electric consumers comprises virtual lighting units, where in each case one of the real lighting units is allocated to one of the virtual lighting units.

9. A process for configuring a configurable device for electric control of a plurality of real electric consumers of a motor vehicle, the process comprising the steps of:
setting up the device for the receipt and processing of at least one electric input signal by a processing unit of the device;
setting up the device for the selection of at least one of a plurality of actions depending on the at least one input signal, wherein the plurality of actions are stored in a memory of the device along with correlations between the plurality of actions and a plurality of operating settings that correspond to a plurality of virtual electric consumers, wherein each of the plurality of operating setting includes a respective universally valid parameter that is independent of the plurality of real electric consumers;

setting up the device for the selection of at least one of the plurality of operating settings depending on the selected at least one of the plurality of actions and the correlations in the memory;

setting up the device for allocation of at least one electric output of the device to at least one of the plurality of real electric consumers depending on the at least one of the plurality of operating settings selected; and setting up the device for generation of at least one output signal output to the at least one of the plurality of real electric consumers based on the at least one of the plurality of operating settings that is correlated in the memory with the at least one of the plurality of actions and the at least one of the plurality of real electric consumers allocated to the at least one electric output.

10. The process in accordance with claim 9, wherein the correlations between the plurality of operating settings of the plurality of virtual electric consumers and the plurality of actions are changeable until a previously determined step in the configuration of the device and unchangeable after the previously determined step.

11. A process for the operation of a system for the control of a plurality of real electric consumers of a motor vehicle, the processing comprising the steps of:

receiving and processing of at least one electric input signal by a processing unit of a configurable device;

selecting at least one of a plurality of actions depending on the at least one input signal, wherein the plurality of actions are stored in a memory of the configurable device along with correlations between the plurality of actions and a plurality of operating settings that correspond to a plurality of virtual electric consumers, wherein each of the plurality of operating setting includes a respective universally valid parameter that is independent of the plurality of real electric consumers;

selecting at least one of the plurality of operating settings depending on the selected at least one of the plurality of actions and the correlations in the memory;

allocating at least one electric output of the configurable device to at least one of the plurality of real electric consumers depending on the at least one of the plurality of operating settings selected;

generating an electric output signal for at least one of the plurality of real electric consumers based on the at least one of the plurality of operating settings selected and the at least one of the plurality of real electric consumers allocated to the at least one electric output.

12. A non-transitory computer readable medium on which instructions for performing the steps of claim 11 are stored.

13. A non-transitory computer readable medium on which instructions for performing the steps of claim 9 are stored.

* * * * *